United States Patent
Parlar et al.

(10) Patent No.: US 8,322,419 B2
(45) Date of Patent: Dec. 4, 2012

(54) METHOD OF GRAVEL PACKING A WELL CONTAINING SYNTHETIC OR OIL-BASED DRILLING FLUIDS

(75) Inventors: Mehmet Parlar, Sugar Land, TX (US); Balkrishna Gadiyar, Katy, TX (US); Geovannys Gonzalez, Maracaibo (VE)

(73) Assignee: Schlumberger Technology Corporation, Sugar Land, TX (US)

(*) Notice: Subject to any disclaimer, the term of this patent is extended or adjusted under 35 U.S.C. 154(b) by 278 days.

(21) Appl. No.: 12/500,008

(22) Filed: Jul. 9, 2009

(65) Prior Publication Data

US 2010/0018709 A1 Jan. 28, 2010

Related U.S. Application Data

(60) Provisional application No. 61/083,670, filed on Jul. 25, 2008.

(51) Int. Cl.
 *E21B 43/04* (2006.01)
 *E21B 21/00* (2006.01)
 *E21B 43/16* (2006.01)

(52) U.S. Cl. ...... 166/278; 166/311; 166/312; 166/305.1

(58) Field of Classification Search .................. 166/278, 166/51, 311, 312, 305.1
See application file for complete search history.

(56) References Cited

U.S. PATENT DOCUMENTS

| | | | |
|---|---|---|---|
| 4,945,991 A | 8/1990 | Jones | |
| 4,945,994 A | 8/1990 | Stagg | |
| 5,320,178 A | 6/1994 | Cornette | |
| 5,320,789 A | 6/1994 | Nishi et al. | |
| 5,551,516 A | 9/1996 | Norman et al. | |
| 5,964,295 A | 10/1999 | Brown et al. | |
| 5,979,555 A | 11/1999 | Gadberry et al. | |
| 5,979,557 A | 11/1999 | Card et al. | |
| 6,140,277 A | 10/2000 | Tibbles et al. | |
| 6,220,345 B1 | 4/2001 | Jones et al. | |
| 6,258,859 B1 | 7/2001 | Dahayanake et al. | |
| 6,355,600 B1 | 3/2002 | Norfleet | |
| 6,435,277 B1 | 8/2002 | Qu et al. | |
| 6,450,260 B1 | 9/2002 | James et al. | |
| 6,509,301 B1 | 1/2003 | Vollmer | |
| 6,569,814 B1 | 5/2003 | Brady et al. | |
| 6,631,764 B2 | 10/2003 | Parlar et al. | |
| 6,638,896 B1 | 10/2003 | Tibbles et al. | |
| 6,660,693 B2 | 12/2003 | Miller | |
| 6,695,054 B2 | 2/2004 | Johnson et al. | |
| 6,703,352 B2 | 3/2004 | Dahayanake et al. | |
| 6,883,608 B2 | 4/2005 | Parlar et al. | |
| 7,066,284 B2 | 6/2006 | Wylie et al. | |
| 7,134,496 B2 | 11/2006 | Jones et al. | |
| 7,225,879 B2 | 6/2007 | Wylie et al. | |
| 7,250,390 B2 | 7/2007 | Patel et al. | |
| 7,341,117 B2 | 3/2008 | Wylie et al. | |
| 7,373,978 B2 | 5/2008 | Barry et al. | |
| 7,419,004 B2 | 9/2008 | Salamat et al. | |
| 2001/0036905 A1* | 11/2001 | Parlar et al. ................... 507/200 |
| 2003/0236174 A1 | 12/2003 | Fu et al. | |
| 2004/0014606 A1 | 1/2004 | Parlar et al. | |
| 2005/0028978 A1* | 2/2005 | Parlar et al. ................... 166/278 |
| 2005/0161219 A1* | 7/2005 | Hossaini et al. ............... 166/278 |
| 2008/0110618 A1* | 5/2008 | Quintero et al. ............... 166/278 |
| 2008/0128129 A1 | 6/2008 | Yeh et al. | |
| 2009/0065207 A1 | 3/2009 | Shenoy et al. | |
| 2009/0133875 A1 | 5/2009 | Tibbles et al. | |
| 2010/0044040 A1 | 2/2010 | Parlar et al. | |

FOREIGN PATENT DOCUMENTS

| | | |
|---|---|---|
| GB | 2420808 A | 6/2006 |
| WO | 2004079145 | 9/2004 |
| WO | 2007092082 | 8/2007 |
| WO | 2010010539 A1 | 1/2010 |

OTHER PUBLICATIONS

Syed Ali et al., "Synthetic Drill-in Fluid for GP Depleted Sands and Pressured Shale." Petroleum Engineer International, Mar. 1999, pp. 31-36.
SPE 64410—R. Tibbles et al., Design and Execution of a 3000-ft Horizontal Gravel-Packed Completion (A Kazakhstan Case History), Oct. 16-18, 2000, Society of Petroleum Engineers Inc.
SPE 86532—G. Hurst et al., Alternate Path Completions: A Critical Review and Lessons Learned From Case Histories with Recommended Practices for Deepwater Applications. Feb. 18-20, 2004, Society of Petroleum Engineers Inc.
SPE 89815—M. Parlar et al., Gravel Packing Wells Drilled with Oil-Based Fluids: A Critical Review of Current Practices and Recommendations for Future Applications, Sep. 26-29, 2004, Society of Petroleum Engineers Inc.
SPE 90758—M. T. Hecker et al., Reducing well Cost by Gravel Packing in Nonaqueous Fluid, Sep. 26-29, 2004, Society of Petroleum Engineers Inc.
SPE 98146—B. S. Powers et al., A Critical Review of Chirag Field Completions Performance—Offshore Azerbaijan B. Feb. 15-17, 2006. Society of Petroleum Engineers Inc.
SPE 107297—K. Whaley et al., Greater Plutonio Openhole Gravel-Pack Completions: Fluid Design and Field Applications. May 30-Jun. 1, 2007, Society of Petroleum Engineers Inc.
International Application No. PCT/IB2009/053253 International Search Report.
International Application No. PCT/IB2009/053664 International Search Report.
Non-final Office Action U.S. Appl. No. 12/502,289; Apr. 5, 2012.
Final Office Action U.S. Appl. No. 12/569,983; Mar. 8, 2012.
Non-Final Office Action U.S. Appl. No. 12/569,983; Jun. 14, 2012.

* cited by examiner

*Primary Examiner* — Shane Bomar
*Assistant Examiner* — Silvana Runyan
(74) *Attorney, Agent, or Firm* — David Matthews; Rodney V. Warfford; Daniel Lundeen

(57) ABSTRACT

A method of gravel packing a wellbore penetrating a subterranean formation. The wellbore has a cased section and an uncased section and contains synthetic or oil-based drilling fluids containing drilled solids. To carry out the method, fresh synthetic or oil-based displacement fluid that is free of drilled solids is introduced into the wellbore to displace the synthetic or oil-based drilling fluids from the uncased section of the wellbore. A water-based displacement fluid is introduced into the wellbore to displace fluids within the cased section of the wellbore. A sand control screen assembly is run to a selected depth within the uncased section of the wellbore. A gravel pack slurry containing gravel and a water-based carrier fluid is then introduced into the wellbore.

26 Claims, No Drawings

METHOD OF GRAVEL PACKING A WELL CONTAINING SYNTHETIC OR OIL-BASED DRILLING FLUIDS

CROSS-REFERENCE TO RELATED APPLICATIONS

This application claims the benefit of U.S. Provisional Patent Application No. 61/083,670, filed Jul. 25, 2008.

BACKGROUND

The statements in this section merely provide background information related to the present disclosure and may not constitute prior art.

Many wells, especially in oil fields in deep-water/subsea environments, are drilled with synthetic/oil-based muds or drilling fluids. Because of the extremely high cost of intervention and high production rates, these wells require a reliable completion technique that prevents sand production and maximizes productivity throughout the entire life of the well. One such technique is open-hole gravel packing.

There are two principal techniques used for gravel packing open holes: (1) the alternate path technique and (2) the water packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

In unconsolidated formations, sand control measures are implemented to stabilize formation sand. Common practice for controlling sand displacement includes placement of a gravel pack to hold formation sand in place. The gravel pack is typically deposited around a screen. The gravel pack filters the sand while still allowing formation fluid to flow through the gravel, the screen and a production pipe.

Most of the recently discovered deep-water fields contain a high fraction of shales, which are water-sensitive, although many have been gravel packed with water-based fluids. A very large fraction of them have been completed with viscous fluids using the alternate path technique. Viscoelastic surfactant (VES) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

In wells drilled with synthetic or oil-based muds, three main approaches have been used for gravel packing. A first approach involves displacement of the entire wellbore to water-based fluids at the end of drilling the reservoir section, and subsequently running the sand control screens into the open hole, setting the packer and gravel packing with a water based fluid. As experienced by several operators, the problem with this approach is that exposure of reactive shales to water-based fluids for prolonged time periods can cause shale collapse or swelling which effectively reduces the wellbore diameter and makes it impossible to install sand control screens to the target depth (see SPE 89815, SPE 90758) or shale dispersion into the carrier fluid during gravel packing which can have a significant impact on well productivity (Ali et al.—Petroleum Engineer International, March 1999). The success of this approach is therefore heavily dependent on the reactivity of the shales.

One approach subsequently practiced involved installation of a pre-drilled (perforated) liner in oil-based mud, then displacement of the entire wellbore to water based fluids, subsequent installation of the sand control screens to target depth and finally gravel packing with a water based fluid. This approach solved the problem of inability to run the screens to target depth, since shale collapse would occur onto the pre-drilled liner, and the space inside the predrilled liner would be substantially free of shales, allowing the screens to be installed to target depth. The problems with this approach were two fold. First, it involved two trips (one for predrilled liner installation and another for screen installation), which is costly, particularly in deep water where rig costs are high. Secondly, a smaller size screen had to be installed into the wellbore, which in some cases can limit production rates, and thus increase the costs.

A more recent approach that has been practiced heavily in two deepwater Angola developments (see SPE 90758 and SPE 107297) and an oilfield in Azerbaijan (see SPE 98146) involved conditioning of the oil based mud by passing the mud through shaker screens of a certain size (to prevent plugging of sand screens), then running the sand screens in conditioned oil based mud, and subsequently displacing the wellbore to water based fluids and proceeding with gravel packing with a water based carrier fluid (U.S. Pat. Nos. 6,883,608 and 7,373,978). This approach has been successfully used in more than 75 wells to date by two major operators, in conjunction with the alternate path (shunt-tube) screens.

While the above-described methods may be adequate for installing sand screens and gravel packing in many wells formed in reactive shale-containing formations, improvements are needed.

SUMMARY

A method of gravel packing a wellbore penetrating a subterranean formation is provided. The area of the subterranean formation surrounding the wellbore may contain reactive shale. The wellbore has a cased section and an uncased section and initially contains synthetic or oil-based drilling fluids containing drilled solids.

To carry out the method, fresh synthetic or oil-based displacement fluid that is free of drilled solids is introduced into the wellbore to displace the synthetic or oil-based drilling fluids from the uncased section of the wellbore. A water-based displacement fluid is introduced into the wellbore to displace fluids within the cased section of the wellbore. The water-based displacement fluid may have a density that is less than the fresh synthetic or oil-based displacement fluid. A sand control screen assembly is run to a selected depth within the uncased section of the wellbore. A gravel pack slurry containing gravel and a water-based carrier fluid is then introduced into the wellbore.

In certain embodiments the water-based carrier fluid is viscosified and may include a polymer viscosifier or a viscoelastic surfactant. The carrier fluid may be an aqueous brine and may include a shale inhibitor.

In some embodiments, the fresh synthetic or oil-based displacement fluid may be substantially free of solids. In others, the fresh synthetic or oil-based displacement fluid may contain bridging agents.

An optional spacer fluid may be introduced into the wellbore ahead of the water-based carrier fluid in certain applications. The spacer fluid may be a viscosified fluid. The spacer fluid may also contain at least one of a mutual solvent and a surfactant.

In certain instances, the sand control screen assembly may include shunt tubes. The sand control screen assembly can also include diverter valves to divert fluid returns to facilitate prevention of pressure build up during the gravel packing operation.

In another method, gravel packing a wellbore penetrating a subterranean formation containing reactive shale where the wellbore has a cased section and an uncased section and contains a synthetic or oil-based drilling fluids containing drilled solids is achieved. In the method, a fresh synthetic or oil-based fluid that is free of drilled solids is introduced into the wellbore to displace the synthetic or oil-based drilling fluids from the uncased section of the wellbore. A water-based displacement fluid of an aqueous brine is introduced into the wellbore to displace fluids within the cased section of the wellbore. The aqueous brine has a density that is less than the synthetic or oil-based displacement fluid. A sand control screen assembly is run to a selected depth within the uncased section of the wellbore. A gravel pack slurry containing gravel and a viscosified, water-based carrier fluid is then introduced into the wellbore.

In certain embodiments the water-based carrier fluid is viscosified with at least one of a polymer viscosifier and a viscoelastic surfactant. The carrier fluid may also include a shale inhibitor.

In some embodiments, the fresh synthetic or oil-based displacement fluid may be substantially free of solids. In others, the fresh synthetic or oil-based displacement fluid may contain bridging agents.

An optional spacer fluid may be introduced into the wellbore ahead of the water-based carrier fluid in certain applications. The spacer fluid may be a viscosified fluid. The spacer fluid may also contain at least one of a mutual solvent and a surfactant.

In others embodiments, the methods includes conducting any suitable treatment for a subterranean formation having a synthetic or an oil-based drilling fluid containing drilled solids disposed therein, by introducing a fresh synthetic or oil-based fluid that is essentially free of drilled solids into a wellbore to displace the synthetic or oil-based drilling fluids from a first section of a wellbore; introducing a water-based displacement fluid of an aqueous brine into the wellbore to displace fluids within a second section of the wellbore, the aqueous brine having a density that is less than the synthetic or oil-based displacement fluid; running a screen assembly to a selected depth; and, introducing a treatment fluid into the wellbore.

DETAILED DESCRIPTION

The description and examples are presented solely for the purpose of illustrating the different embodiments of the invention and should not be construed as a limitation to the scope and applicability of the invention. While any compositions useful in any embodiments may be described herein as comprising certain materials, it should be understood that the composition could optionally comprise two or more chemically different materials. In addition, the composition can also comprise some components other than the ones already cited. While the invention may be described in terms of treatment of vertical wells, it is equally applicable to wells of any orientation. The invention will be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Some embodiments are directed toward novel techniques used for gravel packing and installing sand control screens in a wellbore that may contain synthetic or oil-based drilling muds or fluids, such as those used in drilling wells in formations having reactive shale or clay. As used herein, the expressions "reactive shale" or "reactive clay" or similar expressions may be used interchangeably and refer to those shale or clay materials that may swell, crumble, particalize, flake, slough off or otherwise deteriorate when exposed to aqueous fluids, particularly fresh water.

Synthetic or oil-based drilling muds or fluids may be used during drilling to prevent damage or deterioration of the formations containing reactive shale or clay. As used herein, the expressions "drilling muds," "drilling fluids" or similar expressions may be used interchangeably and are meant to encompass those fluids used during the drilling of a wellbore. Synthetic-based drilling fluids are typically those that include non-naturally occurring components that are derived through chemical processes. Examples of such synthetic-based components include chemically-produced mineral oils, paraffins, linear olefins, esters, etc. Oil-based drilling fluids are those that include components derived or extracted from naturally existing petroleum products through refining or other separating techniques. Examples of such oil-based components include refinery-produced diesel, mineral oil and paraffins.

The synthetic or oil-based drilling fluids may be formed entirely from non-aqueous synthetic or oil-based fluids or may include an aqueous or water component. Such synthetic or oil-based drilling fluids that include an aqueous or water component may be in the form of emulsions, where the aqueous component is present as an internal phase within a continuous or external synthetic or oil phase. The aqueous phase may be a brine, saline or salt solution, and may contain emulsifiers for forming the emulsion. The aqueous phase may be present in an amount of from about 2% to about 60% by volume of the fluid, although lesser or greater amounts may be used.

In the drilling of a well, the synthetic/oil-based muds or drilling fluids may be used in formations containing reactive shall or clay materials. The drilling fluid is typically circulated through the drilling string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where, in some embodiments, a sand screen assembly is placed to facilitate gravel packing for controlling the migration and production of formation sand and to stabilize the formation of the open hole section.

Once the wellbore is drilled, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections.

In accordance with some embodiments, prior to installing the sand screen, the synthetic/oil-based drilling fluid is first displaced from the open hole section to a fresh synthetic/oil-based displacement fluid that does not contain any drilled solids or cuttings, or is essentially free of drilled solids or cuttings. As used herein, the expression "fresh" or "essentially free of" with respect to the synthetic and oil-based fluids described herein is meant to encompass those synthetic and oil-based fluids that have not been previously used as drilling muds or fluids, which may contain some portion of cuttings or drilled solids, and is meant to exclude those synthetic and oil-based fluids that have been previously used as drilling fluids or muds but that may have been filtered or otherwise conditioned to remove any cuttings or drilled solids.

The composition of the synthetic/oil-based displacement fluid, however, may be the same or similar to that used for forming drilling fluids or muds, as has been previously described. The synthetic or oil-based displacement fluids may contain additives, such as bridging agents and/or weighting agents, which are also commonly used in drilling fluids. Bridging agents are added to the fluid to bridge across pore throats of exposed rock to facilitate building of a filter cake along the surfaces of the formation to prevent loss of treatment fluids to the formation. The bridging agents may selected to be removable, such as due to their solubility in certain fluids. Examples of bridging agents may include calcium carbonate, calcium hydroxide, various water soluble salts, soluble polymers (e.g. polylactic acid), waxes, oil-soluble resin, etc. These may be used in an amount of from about 10 lbs/bbl (28.3 kg/m$^3$) to about 30 lbs/bbl (85.2 kg/m$^3$) of the displacement fluid.

Weighting agents may be used to increase the density of the synthetic or oil-based displacement fluid. These materials may be finely divided solid materials that have high specific gravities. Examples of weighting agents may include barite, hematite, siderite, ilmenite, etc. Calcium carbonate may also be used as a weighting agent, in addition to a bridging agent. Barite is a particularly well suited weighting agent, having a minimum specific gravity of 4.2 g/cm$^3$. Weighting agents may be used in amounts to provide the desired weighting characteristics to the synthetic/oil-based displacement fluids.

If solids are used in the synthetic/oil-based displacement fluid, such as bridging agents, etc., these may be selected to be sufficiently small so that they readily pass through and do not plug or interfere with the openings of the sand screen. Typically, such solids will be selected to have a particle size to provide a screen-opening-to-particle-size ratio of about 4:1 to about 6:1 or higher. In some embodiments, the synthetic or oil-based displacement fluid may be substantially free of any solids, including non-drilled solids.

Displacement of the drilling fluids from the open hole section may be carried out by introducing the displacement fluid into the wellbore by passing the synthetic/oil-based displacement fluid through the tubular drill string to the open hole section. As the synthetic/oil-based displacement fluid is pumped through the drill string, the drilling fluids in the open hole section are carried upward through the annulus formed by the casing and the drill string. The presence of the synthetic/oil-based displacement fluid within the open hole section facilitates maintaining of the integrity of the open hole section, which may contain reactive shales or clays that would otherwise be damaged if water-based fluids were used to displace the drilling muds or fluids. In certain embodiments, the volume of synthetic/oil-based displacement fluid used is sufficient to displace the open hole section plus the cased hole section up to the packer setting depth. The volume of synthetic/oil-based displacement fluid used may vary, however.

When a sufficient volume of the synthetic/oil-based displacement fluid is introduced into the wellbore to displace the drilling fluid from the open hole section of the wellbore, a water-based displacement fluid is used to displace at least a portion or all of the cased hole section of the wellbore. In certain embodiments, the volume of the water-based is sufficient to displace the entire cased section above the packer setting depth. This may be carried out by raising the end of the tubular drill string so that it is positioned within the cased hole section above the open hole section so that the water-based displacement fluid is discharged from the end of the drill string into the cased hole section.

The water-based displacement fluid may be an aqueous brine. The aqueous brine is comprised of water and inorganic salts and/or organic salts. The inorganic salts may include monovalent salts of alkali metal halides and divalent salts of alkali earth metal halides. Examples of suitable monovalent salts include sodium, potassium or cesium chloride or bromide. Examples of suitable inorganic divalent salts include calcium halides, for example, calcium chloride or calcium bromide. Zinc halides, especially zinc bromide, may also be used. The inorganic salts can be added to the aqueous displacement fluid in any hydration state (i.e. anhydrous, monohydrated, dihydrated, etc.). The aqueous displacement fluid may also comprise an organic salt, such as sodium, potassium or cesium formate, acetate or the like. The amount of salts used may provide a desired density to the displacement fluid, as well as in some cases shale stability. The water-based displacement fluid may have a density that is less than the synthetic/oil-based displacement present within the open hole section to ensure that the water-based displacement fluid remains above and does not settle or displace the synthetic/oil-based displacement fluid in the open hole section. Typically, the water-based displacement fluid will have a density of up to about 19 ppg (2.3 kg/liter).

The aqueous displacement fluid may contain varies additives, such as mutual solvents, surfactants, shale stabilizers and non-emulsifiers. The mutual solvent or surfactant may be present within the water-based displacement fluid in an amount of from about 10% or less by weight. Examples of suitable mutual solvents include ethyleneglycolmonobutylether (EGMBE), methanol, etc.

The use of the synthetic/oil-based and water-based displacement fluids in the open and cased hole sections, respectively, facilitates the removal of solids present in the drilling fluids that could otherwise clog the sand screens. Additionally, the use of the synthetic/oil-based displacement fluid in the open hole section prevents the reactive shales and clay materials in the open hole section from swelling, collapsing or otherwise deteriorating and thus preventing sand screens from being lowered to the desired position within the well bore. This may eliminate the need for the use of a liner, as used in prior art methods. Because the water-based displacement fluid is located substantially within the casing, the fluid is isolated from the open hole section, so there is no or little potential for damage to the reactive materials of the formation from these fluids.

The displacement method of the invention can be used with almost any type of sand control screen assembly. These may include wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. The sand control screen assembly may also include those with alternate flow paths or shunt tubes. Moreover, screen assemblies may include those that include diverter valves for diverting fluid returns through a shorter pathway, preventing pressure build up during the gravel packing process. An example of such a sand control screen that is suitable for the method of the invention is that described in U.S. Pat. App. Pub. No. 2009/0133875, which is herein incorporated by reference in its entirety.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a water-based carrier fluid is introduced into the wellbore to facilitate gravel packing of the open hole section of wellbore in the annulus surrounding the sand control screen. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member. The carrier fluid is conducted to the crossover tool and into the annulus between the casing and the tubular member above the packer.

The gravel particles can be ceramics, natural sand or other particulate materials suitable for such purposes. The gravel particles are sized so that they will not pass through the screen openings. Typical particle sizes in U.S. mesh size may range from about 12 mesh (1.68 mm) to about 70 mesh (0.210 mm). A combination of different particle sizes may be used. Examples of typical particle size combinations for the gravel particles are from about 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). The gravel particles may be coated with a resin to facilitate binding of the particles together. The resin-coated particles may be pre-cured or may cure in situ, such as by an overflush of a chemical binding agent or by elevated formation temperatures.

The gravel pack carrier fluid is a water-based fluid. The aqueous fluid may be composed of an aqueous brine or salt solution and may be the same or similar to that used for the water-based displacement fluid. The brine or salt solution may include an inorganic salt or organic salt, such as those described above for the aqueous displacement fluid. The carrier fluid may have a fluid density of from about 8.8 ppg (1.05 kg/L) to about 19.2 ppg (2.3 kg/L), more typically from about 8.8 ppg (1.05 kg/L) to about 14.2 ppg (1.70 kg/L).

The aqueous carrier fluid may also be viscosified with a viscosifying agent. The amount and type of viscosifying agent is selected to provide the desired carrying effect for the gravel particles and to ensure efficient return of the carrier fluid. The viscosifying agents may include those described in U.S. Pat. App. Pub. No. 2009/0065207, which is herein incorporated by reference.

In some embodiments, the viscosifying agent may be a solvatable or hydratable polymer that is either crosslinked or non-crosslinked (i.e. linear). Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers may also be used and are particularly well suited for high-temperature applications.

In various embodiments, the polymer viscosifying agent may be present in an amount of from about 0.1 wt. % to about 1.5 wt. % of total weight of the carrier fluid, from about 0.1 wt. % to about 0.7 wt. % of total weight of carrier fluid, from about 0.1 wt. % to about 0.6 wt. % of total weight of carrier fluid, from about 0.1 wt. % to about 0.5 wt. % of total weight of carrier fluid, from about 0.1 wt. % to about 0.4 wt. % total weight of carrier fluid, from about 0.1 wt. % to about 0.3 wt. % of total weight of carrier fluid, or even from about 0.1 wt. % to about 0.2 wt. % of total weight of carrier fluid.

In other embodiments of the invention, a viscoelastic surfactant (VES) may be used as a viscosifying agent for the carrier fluid. The VES may be selected from the group consisting of cationic, anionic, zwitterionic, amphoteric, non-ionic, and combinations of these. Some nonlimiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination with other viscosifying agents, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into the carrier fluid, the amount of the VES can range from about 0.2% to about 15% by weight of total weight of the fluid, more particularly from about 0.5% to about 15% by weight of total weight of fluid, more particularly from about 2% to about 10% by weight of total weight of fluid.

Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al.

The carrier fluid may also be formed from a combination of those hydratable polymers, VES and associative polymers previously described and provided in various amounts and proportions to provide the desired carrier fluid properties.

In certain applications, a shale inhibitor may be included in the aqueous carrier fluid. Some examples of shale inhibitors are acrylamide based polymers, lignosulfonates, amines, and the like, or a combination of such compounds. The shale inhibitors may include glycol based shale inhibitors, such as propylene or ethylene glycol. The shale inhibitors may be used in amounts of from about 0.4% to about 4% by weight of the carrier fluid, although lesser or greater amounts may be used.

Amine shale inhibitors are particularly well suited for some embodiments. Some nonlimiting examples of suitable amine shale inhibitors include those disclosed in U.S. Provisional Patent Application Ser. No. 60/971,455, filed Sep. 11, 2007, and in corresponding U.S. Pat. App. Pub. No. 2009/0065207, both of which are incorporated by reference in their entireties. In some embodiments, the shale inhibitor may be a polyamine of the formula $H_2—N—R—(0-R')x-NH_2$ wherein R and R' are divalent hydrocarbyl such as alkylene of from 1 to 6 carbon atoms, e.g. methylene, ethylene, propylene, butylene, pentylene, hexylene, or the like, and x has a value from 1 to 10, or an acid addition product thereof. Stated another way, the shale inhibitor in one embodiment is a poly(oxyalkylene) polyamine. In certain embodiments, R and R' in the above formula are the same or different branched alkylene of 3 to 5 carbon atoms, e.g. 1,2-propylene, 1,2-butylene, 1,3-butylene, 1,2-pentylene, 1,3-pentylene, 1,4-pentylene, etc. In other embodiments, the shale inhibitor is a diamine ether according to the following Formula (1):

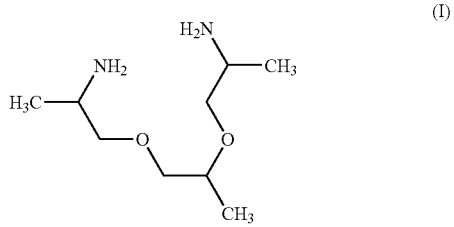

(I)

or an acid addition salt thereof.

Prior to the introduction of the gravel packing slurry, a spacer fluid may optionally be introduced into the open hole section. The spacer fluid may be used in situations where the gravel packing carrier fluid is sensitive to the synthetic/oil-based fluids present in the wellbore section. This may be true when VES viscosified fluids are used as the carrier fluid, which may break when contacted with synthetic or oil-based fluids. Additionally, aqueous brines used in the gravel packing slurry may mix with the synthetic/oil-based fluids within the wellbore, which may form an emulsion with or increase the internal aqueous emulsion phase of such fluids so that they may be more viscous and difficult to pump.

The spacer fluid may be an aqueous fluid that contains a mutual solvent or surfactant, having solubility for both the synthetic/oil-based fluid and the aqueous fluid. The spacer fluid may be an aqueous fluid that is similar in composition to the carrier fluid used for gravel packing, as previously described. This includes the use of aqueous brines and salt solutions, with similar additives. A viscosifying agent, such as those previously described, may also be used in the spacer fluid. The viscosifying agent may be present within the spacer fluid in similar or lesser amounts than those used for the carrier fluid.

Additionally, the spacer fluid may contain a mutual solvent or a surfactant may be present in the spacer fluid. The mutual solvent or surfactant may be present within the spacer fluid in an amount of from about 10% or less by weight. Examples of suitable mutual solvents include ethyleneglycolmonobutylether (EGMBE), methanol, etc.

The spacer fluid is optionally introduced into the open hole section of the wellbore prior to the introduction of the gravel packing slurry. The spacer fluid is typically used in a volume of about 10 bbl (1.59 m$^3$) to about 150 bbl (23.9 m$^3$). In other embodiments no spacer fluid is used.

Some embodiments are methods for gravel packing an open hole section of wellbore in a subterranean formation containing reactive shales or clays. By using a combination of both fresh synthetic/oil-based and aqueous displacement fluids in the open hole and cased hole sections, respectively, of the well, the drilling fluid can be effectively displaced to remove drilling solids without damaging the formation. This allows the screen assembly to be run fully to target depth in fluids that do not contain drilled solids and ensures that reactive formation materials do not collapse, swell or otherwise deteriorate that might prevent the screen assembly from being properly positioned. Once the screen assembly is in place, gravel packing can be carried out to consolidate the formation materials. The well can then be placed in production with formation fluids flowing through the gravel pack and screen and through the wellbore to the surface.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of gravel packing a wellbore penetrating a subterranean formation, the wellbore comprising a cased section and an uncased section, and the wellbore having a synthetic or an oil-based drilling fluid containing drilled solids disposed in the wellbore, the method comprising:
   introducing a fresh synthetic or oil-based displacement fluid that is essentially free of drilled solids into the wellbore to displace the synthetic or oil-based drilling fluids from the uncased section of the wellbore;
   then introducing a water-based displacement fluid into the wellbore to displace fluids within the cased section of the wellbore, wherein the water-based displacement fluid is isolated from the uncased section of the wellbore;

then running a sand control screen assembly to a selected depth within the uncased section of the wellbore; and then introducing a gravel pack slurry containing gravel and a water-based carrier fluid into the wellbore.

2. The method of claim 1, wherein the water-based carrier fluid is viscosified.

3. The method of claim 2, wherein the water-based carrier fluid is viscosified with a polymer viscosifier.

4. The method of claim 2, wherein the water-based carrier fluid is viscosified with a viscoelastic surfactant.

5. The method of claim 1, wherein the carrier fluid is an aqueous brine.

6. The method of claim 1, wherein the carrier fluid includes a shale inhibitor.

7. The method of claim 1, wherein the fresh synthetic or oil-based displacement fluid is substantially free of solids.

8. The method of claim 1, wherein the fresh synthetic or oil-based displacement fluid contains bridging agents selected to have a particle size to provide a screen-opening-to-particle-size ratio of about 4:1 or higher.

9. The method of claim 1, wherein the water-based displacement fluid has a density that is less than the fresh synthetic or oil-based displacement fluid.

10. The method of claim 1, wherein the area of the subterranean formation surrounding the wellbore contains reactive shale.

11. The method of claim 1, wherein the sand control screen assembly includes shunt tubes.

12. The method of claim 1, wherein the sand control screen assembly includes diverter valves to divert fluid returns to facilitate prevention of pressure build up.

13. The method of claim 1, wherein the uncased section of the wellbore is non-vertical.

14. The method of claim 1, wherein a spacer fluid is introduced into the wellbore ahead of the water-based carrier fluid.

15. The method of claim 14, wherein the spacer fluid is viscosified.

16. The method of claim 14, wherein the spacer fluid contains at least one of a mutual solvent and a surfactant.

17. A method of gravel packing a wellbore penetrating a subterranean formation containing reactive shale, the wellbore having a cased section and an uncased section, and the wellbore having a synthetic or an oil-based drilling fluid containing drilled solids disposed in the wellbore, the method comprising:

introducing a fresh synthetic or oil-based fluid that is essentially free of drilled solids into the wellbore to displace the synthetic or oil-based drilling fluids from the uncased section of the wellbore, wherein the fresh synthetic or oil-based displacement fluid has not been previously used as a drilling fluid or mud and is free of used drilling fluids and muds filtered to remove drilled solids;

then introducing a water-based displacement fluid of an aqueous brine into the wellbore to displace fluids within the cased section of the wellbore, the aqueous brine having a density that is less than the synthetic or oil-based displacement fluid, wherein the water-based displacement fluid is isolated from the uncased section of the wellbore;

then running a sand control screen assembly to a selected depth within the uncased section of the wellbore, wherein if any solids are present in the fresh synthetic or oil-based fluid in the uncased section of the wellbore the solids present provide a ratio of screen opening size to solid particle size of at least 4:1; and then introducing a gravel pack slurry containing gravel and a viscosified, water-based carrier fluid into the wellbore.

18. The method of claim 17, wherein the water-based carrier fluid is viscosified with at least one of a polymer viscosifier and a viscoelastic surfactant.

19. The method of claim 17, wherein the carrier fluid includes a shale inhibitor.

20. The method of claim 17, wherein the fresh synthetic or oil-based displacement fluid is substantially free of solids.

21. The method of claim 17, wherein the fresh synthetic or oil-based displacement fluid contains bridging agents.

22. The method of claim 17, wherein the water-based displacement fluid has a density that is less than the fresh synthetic or oil-based fluid.

23. The method of claim 17, wherein a spacer fluid is introduced into the wellbore ahead of the water-based carrier fluid.

24. The method of claim 17, wherein the uncased section of the wellbore is non-vertical.

25. The method of claim 23, wherein the spacer fluid contains at least one of a mutual solvent and a surfactant.

26. A method of treating a subterranean formation having a synthetic or an oil-based drilling fluid containing drilled solids disposed therein, the method comprising:

introducing a fresh synthetic or oil-based fluid that is essentially free of drilled solids into a wellbore to displace the synthetic or oil-based drilling fluids from a first section of a wellbore, wherein the fresh synthetic or oil-based displacement fluid has not been previously used as a drilling fluid or mud and is free of used drilling fluids and muds filtered to remove drilled solids;

then introducing a water-based displacement fluid of an aqueous brine into the wellbore to displace fluids within a second section of the wellbore, the aqueous brine having a density that is less than the synthetic or oil-based displacement fluid;

then running a screen assembly to a selected depth; and, then introducing a treatment fluid into the wellbore.

* * * * *